United States Patent
Wu et al.

(10) Patent No.: US 12,141,002 B2
(45) Date of Patent: Nov. 12, 2024

(54) HASHBOARD, POWER SUPPLY SYSTEM OF DIGITAL PROCESSING DEVICE, AND DIGITAL PROCESSING DEVICE

(71) Applicant: SHENZHEN MICROBT ELECTRONICS TECHNOLOGY CO., LTD., Guangdong (CN)

(72) Inventors: Yuefeng Wu, Guangdong (CN); Zuoxing Yang, Guangdong (CN); Yang Gao, Guangdong (CN); Haifeng Guo, Guangdong (CN); Hongyan Ning, Guangdong (CN)

(73) Assignee: SHENZHEN MICROBT ELECTRONICS TECHNOLOGY CO., LTD., Guangdong (CN)

( * ) Notice: Subject to any disclaimer, the term of this patent is extended or adjusted under 35 U.S.C. 154(b) by 12 days.

(21) Appl. No.: 18/043,843

(22) PCT Filed: Jun. 11, 2021

(86) PCT No.: PCT/CN2021/099622
§ 371 (c)(1),
(2) Date: Mar. 2, 2023

(87) PCT Pub. No.: WO2022/083139
PCT Pub. Date: Apr. 28, 2022

(65) Prior Publication Data
US 2023/0376059 A1 Nov. 23, 2023

(30) Foreign Application Priority Data

Oct. 20, 2020 (CN) .......................... 202011125347.6
Nov. 17, 2020 (CN) .......................... 202011284017.0

(51) Int. Cl.
*G06F 1/18* (2006.01)

(52) U.S. Cl.
CPC .................................. *G06F 1/188* (2013.01)

(58) Field of Classification Search
CPC ....................................................... G06F 1/188
(Continued)

(56) References Cited

U.S. PATENT DOCUMENTS 10,381,758 B1 8/2019 Scanlon
2001/0024358 A1* 9/2001 Bonet ................ H05K 7/20581
361/695

(Continued)

FOREIGN PATENT DOCUMENTS

CN          206039425 U      3/2017
CN          106774767 A      5/2017
(Continued)

OTHER PUBLICATIONS

International Search Report and Written Opinion mailed Sep. 10, 2021 in International Patent Application PCT/CN2021/099622.

(Continued)

*Primary Examiner* — Paul R. Myers
(74) *Attorney, Agent, or Firm* — Dickinson Wright PLLC (57) ABSTRACT

A hashboard, a power supply system of a digital processing device and the digital processing device. The digital processing device comprises: a housing; N (≥2) hashboards and a control board both located inside the housing. Each hashboard comprises: a substrate; power positive and power negative terminals respectively mounted on the substrate and adapted to be connected to another hashboard in series; a communication interface mounted on the substrate; and computing chips mounted on the substrate. A signal transfer path of the computing chips has a chain configuration. The N hashboards are connected in series to form a series power supply configuration, a power positive terminal of a first hashboard in the series power supply configuration is con- (Continued)

nected to a positive terminal of a power supply, and a power negative terminal of a last hashboard in the series power supply configuration is connected to a negative terminal of the power supply.

14 Claims, 6 Drawing Sheets

(58) Field of Classification Search
USPC .......................................................... 713/300
See application file for complete search history.

(56) References Cited

U.S. PATENT DOCUMENTS

| | | | | |
|---|---|---|---|---|
| 2002/0124114 | A1* | 9/2002 | Bottom | H04L 49/351 709/251 |
| 2006/0020722 | A1* | 1/2006 | Lee | G06F 13/4269 710/62 |
| 2006/0132105 | A1* | 6/2006 | Prasad | H02M 1/4225 323/222 |
| 2011/0254373 | A1* | 10/2011 | Johnson | H02M 7/483 307/77 |
| 2013/0111098 | A1* | 5/2013 | Li | H05K 7/1492 361/752 |
| 2013/0297954 | A1* | 11/2013 | Martin | G01R 31/58 713/310 |
| 2013/0298173 | A1* | 11/2013 | Couleaud | H04N 21/436 725/76 |
| 2020/0012579 | A1* | 1/2020 | Anokhin | G06F 11/3476 |
| 2021/0026729 | A1* | 1/2021 | Ferreira | G06F 11/0793 |
| 2021/0124406 | A1* | 4/2021 | Ma | H02M 1/32 |
| 2023/0114864 | A1* | 4/2023 | Fujimura | H02J 50/12 713/300 |

FOREIGN PATENT DOCUMENTS

| | | |
|---|---|---|
| CN | 108762460 A | 11/2018 |
| CN | 109101392 A | 12/2018 |
| CN | 110989751 A | 4/2020 |

OTHER PUBLICATIONS

First Office Action issued May 17, 2024 in Canadian Patent Application No. 3,184,978.

* cited by examiner

HASHBOARD, POWER SUPPLY SYSTEM OF DIGITAL PROCESSING DEVICE, AND DIGITAL PROCESSING DEVICE

CROSS REFERENCE TO RELATED APPLICATIONS

The present application is a U.S. National Phase Application of PCT/CN2021/099622, filed Jun. 11, 2021, which claims the benefit and priority of Chinese Patent Application No. 202011125347.0, filed with the China National Intellectual Property Administration on Oct. 20, 2020, and Chinese Patent Application No. 202011284017.6, filed with the China National Intellectual Property Administration on Nov. 17, 2020, the disclosures of which are hereby incorporated by reference in their entireties.

TECHNICAL FIELD

This application belongs to the technical field of digital currency, and in particular, to a hashboard, a power supply system of a digital processing device, and the digital processing device.

BACKGROUND

Currently, with the development of the digital currency technology, the digital processing device is used for performing the calculation to obtain the digital currency, and such digital processing device is also referred to a mining machine. The digital currency can be considered as a type of virtual currency based on the node network and the digital encryption algorithm. The core characteristics of the digital currency mainly include: 1. the digital currency has no issuer since it comes from some open algorithms; 2. the total amount of the digital currency is fixed since the number of the solutions of the algorithm is determined; and 3. the transaction process of the digital currency is sufficiently secure since the transaction process requires the approval of each node in the network.

With the rapid development of the supercomputer, the digital processing device for obtaining the digital currency has gradually developed toward the implementation of the Application-Specific Integrated Circuit (ASIC) with the lower power consumption and the lower costs. At present, the digital processing device generally runs the firmware customized by the manufacturer to complete the functions such as connecting to the digital processing device set (also referred to a mining pool), running the computing program, and providing the operation and maintenance interface of the physical hardware (also referred to a mining farm) of the digital processing device set.

SUMMARY

Embodiments of this application provide a hashboard, a power supply system of a digital currency digital processing device, and the digital currency digital processing device.

The technical solutions of the embodiments of this application are as follows:

A hashboard of a digital processing device for obtaining digital currency comprises:
  a substrate;
  a power positive terminal and a power negative terminal, respectively mounted on the substrate and adapted to be connected to another hashboard in series;
  a communication interface mounted on the substrate; and
  a plurality of computing chips mounted on the substrate, wherein a signal transfer path of the plurality of computing chips has a chain configuration.

In an implementation, the hashboard further comprises:
  an isolation circuit mounted on the substrate, wherein the isolation circuit comprises a first end and a second end, the first end is adapted to be connected to the communication interface, and the second end is adapted to be connected to a computing chip, which is a signal receiving starting point of the hashboard, in the chain configuration.

In an implementation, the hashboard further comprises:
  a voltage equalizing circuit mounted on the substrate, wherein the voltage equalizing circuit is arranged between the power positive terminal and the power negative terminal, and adapted to equalize a voltage difference between the hashboard and another hashboard.

In an implementation, the isolation circuit comprises at least one of:
  a dedicated isolation chip; an optically coupled isolation circuit; a transformer isolation circuit; an isolation capacitor; and an Ethernet interface comprising a transformer.

In an implementation, the voltage equalizing circuit comprises a buck circuit and a boost circuit.

In an implementation, the substrate is an aluminum substrate.

A digital processing device for obtaining digital currency comprises:
  a housing;
  a control board located inside the housing; and
  N hashboards located inside the housing, N being a positive integer of at least 2, wherein each hashboard comprises: a substrate; a power positive terminal and a power negative terminal, respectively mounted on the substrate and adapted to be connected to another hashboard in series; a communication interface mounted on the substrate; and a plurality of computing chips mounted on the substrate, wherein a signal transfer path of the plurality of computing chips has a chain configuration;
  wherein the N hashboards are connected in series to form a series power supply configuration, a power positive terminal of a first hashboard in the series power supply configuration is connected to a positive terminal of a power supply, and a power negative terminal of a last hashboard in the series power supply configuration is connected to a negative terminal of the power supply.

In an implementation, the control board comprises:
  a controller; and
  N isolation circuits in one-to-one correspondence with the N hashboards,
  wherein each isolation circuit comprises a first end and a second end, the first end is adapted to be connected to a communication interface in a hashboard corresponding to the isolation circuit, and the second end is adapted to be connected to the controller.

In an implementation, each hashboard further comprises:
an isolation circuit mounted on the substrate; the isolation circuit comprising a first end and a second end, the first end being adapted to be connected to the communication interface, and the second end being adapted to be connected to a computing chip, which is a signal receiving starting point of the hashboard, in the chain configuration.

In an implementation, each hashboard further comprises:
a voltage equalizing circuit mounted on the substrate; the voltage equalizing circuit arranged between the power positive terminal and the power negative terminal, and adapted to equalize a voltage difference between the hashboard and another hashboard.

In an implementation, the power supply comprises: (N−1) voltage equalizing circuits in one-to-one correspondence with (N−1) hashboards of the N hashboards other than the first hashboard;

wherein each voltage equalizing circuit comprises a positive terminal and a negative terminal, the positive terminal is connected to a power positive terminal of a corresponding hashboard, and the negative terminal is connected to a power negative terminal of the corresponding hashboard.

In an implementation, the power supply is mounted to an outer wall of the housing.

A power supply system of a digital processing device for obtaining digital currency comprises:

a digital currency digital processing device according to any one of the above; and a power supply for supplying power to the digital currency digital processing device.

In an implementation, the power supply comprises N power supply submodules connected in series with each other, the N power supply submodules being in one-to-one correspondence with the N hashboards of the digital currency digital processing device, wherein each power supply submodule comprises a positive electrode and a negative electrode, the positive electrode is connected to a power positive terminal of a corresponding hashboard, and the negative electrode is connected to a power negative terminal of the corresponding hashboard.

In an implementation, the power supply comprises a power factor correction circuit;

wherein a sum of voltages of the N hashboards of the digital currency digital processing device is equal to an output voltage of the power factor correction circuit.

In an implementation, the power supply comprises: (N−1) voltage equalizing circuits in one-to-one correspondence with (N−1) hashboards of the N hashboards other than the first hashboard;

wherein each voltage equalizing circuit comprises a positive terminal and a negative terminal, the positive terminal is connected to a power positive terminal of a corresponding hashboard, and the negative terminal is connected to a power negative terminal of the corresponding hashboard.

It can be seen from the above technical solutions that in the implementations of this application, the hashboard includes: a substrate; a power positive terminal and a power negative terminal, respectively mounted on the substrate and adapted to be connected to another hashboard in series; a communication interface mounted on the substrate; and a plurality of computing chips mounted on the substrate, where a signal transfer path of the plurality of computing chips has a chain configuration. It can be seen that after adopting the implementations of this application, the mindset that a parallel configuration must be used to supply power to the hashboards is overcome, and a series configuration is used to supply power to the hashboards, which not only improves the power supply efficiency, but also reduces the complexity and the costs of the power supply design.

DETAILED DESCRIPTION

To make objectives, technical solutions and advantages of this application be clearer, the application is further described in detail with reference to the accompanying drawings below.

For concise and intuitive description, solutions of this application are set forth below by describing several representative implementations. A large quantity of details in the implementations are merely used for helping understand the solutions of this application. But obviously, implementation of the technical solutions of this application may not be limited to these details. To avoid unnecessarily blurring the solutions of this application, some implementations are not described in detail, but only frames are given. Hereinafter, "comprise" refers to "comprise, but is not limited to", and "according to . . . " refers to "at least according to . . . , but not limited to only according to . . . ". Because of Chinese language habits, the following does not particularly specify the number of the component, which means that the component may be one or more, or can be understood as at least one.

Figure 1:
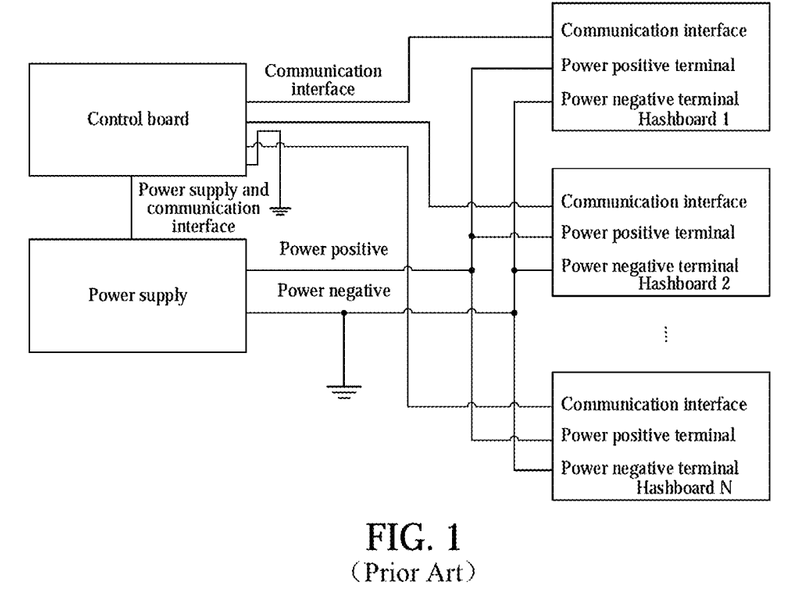
FIG. 1 is a structural diagram of a power supply system of a digital currency digital processing device in the prior art.

A digital processing device for obtaining digital currency generally includes a plurality of hashboards. In order to improve the computing power, the hashboard is generally a circuit board which adopts the layout in chip array. Usually, the hashboard includes several computing chips (such as ASICs). The core voltage power supply of the computing chips within the hashboard mostly adopts a series power supply mode. The computing chips in series form multiple levels of voltage domains in series. Each voltage domain has one or more computing chips. A power negative (ground or reference ground) of the computing chip of a former level of voltage domain is connected end to end with a power positive of the computing chip of a latter level of voltage domain. Meanwhile, the hashboards are powered in parallel from the power supply. FIG. 1 is a structural diagram of a power supply system of a digital processing device. It can be seen from FIG. 1 that, the hashboard 1, the hashboard 2, . . . , and the hashboard N are connected in parallel with each other, and each obtain electric energy from the power supply independently.

The applicant finds that: in some hashboard power supply configurations of the digital processing device for obtaining the digital currency, the hashboards each obtain electric energy from the power supply in parallel. In such power supply configuration, as the computing power demand of the digital processing device becomes higher and higher, the power of the digital processing device becomes higher and higher, the output current of the power supply becomes larger and larger, the output loss of the power supply is directly proportional to the square of the current and also increases dramatically, and the power supply efficiency will decrease. Moreover, since the hashboards are connected in parallel with each other, and the power supply needs to provide a relatively low direct current (DC) voltage for each hashboard, the power supply further needs to have a DC buck function, for example, to deploy a DC-DC device, which leads to problems of the complex power supply design and the increased costs.

After analysis, the applicant finds that a root of the above technical problems is: the prior art is constrained by the mindset that the parallel configuration must be employed to supply power to the hashboards in order to ensure the smooth startup of each computing chip, and ignores the feasibility of supplying power to the hashboards in series when the computing chip is optimized in design, which leads to the above-mentioned technical problems.

In implementations of this application, the mindset that the parallel configuration must be employed to supply power to the hashboards is overcome, and the series configuration is employed to supply power to the hashboards, which not only improves the power supply efficiency, but also reduces the complexity and the costs of the power supply design.

Figure 2:
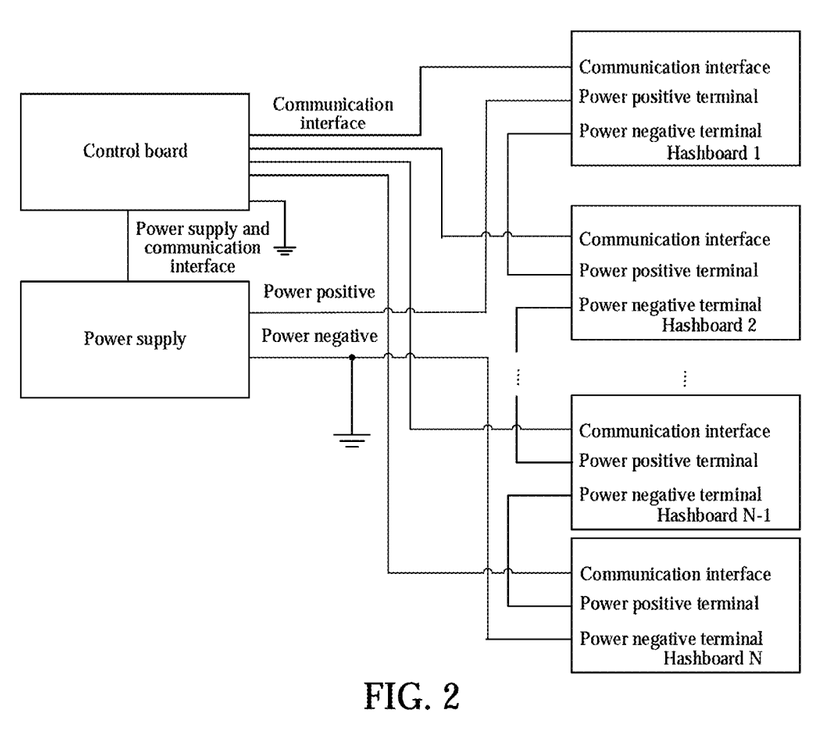
FIG. 2 is an exemplary structural diagram of a power supply system of a digital currency digital processing device of this application.

FIG. 2 is an exemplary structural diagram of a hashboard power supply system of a digital processing device for obtaining digital currency of this application.

It can be seen from FIG. 2 that, the hashboard 1, the hashboard 2, . . . , and the hashboard N are connected in series with each other, to obtain electric energy from the power supply, wherein N is a positive integer greater than or equal to 2. Each hashboard includes its own power positive terminal and power negative terminal respectively.

In the series power supply configuration as shown in FIG. 2, the power negative terminal of each former level of hashboard is connected to the power positive terminal of a latter level of hashboard of the former level of hashboard. Moreover, the power positive terminal of the first hashboard in the series power supply configuration is connected to the positive terminal of the power supply, and the power negative terminal of the last hashboard in the series power supply configuration is connected to the negative terminal of the power supply.

Specifically, the hashboard 1 is in series connection to the hashboard 2 (the hashboard 1 is the former level of hashboard of the hashboard 2), the hashboard 2 is in series connection to the hashboard 3 (the hashboard 2 is the former level of hashboard of the hashboard 3), . . . , and so on, until series connection to the hashboard N successively. The hashboard 1 is the first hashboard in the series configuration. The power positive terminal of the hashboard 1 is connected to the positive terminal of the power supply; the power negative terminal of the hashboard 1 is connected to the power positive terminal of the hashboard 2; the power negative terminal of the hashboard 2 is connected to the power positive terminal of the hashboard 3, and the power negative terminal of the hashboard 3 is connected to the power positive terminal of the latter level of hashboard of the hashboard 3; . . . , and so on, until the power negative terminal of the hashboard N−1 is connected to the power positive terminal of the hashboard N. The hashboard N is the last hashboard in the series configuration. The power negative terminal of the hashboard N is connected to the negative terminal of the power supply. For example, the negative terminal of the power supply can be grounded.

In addition, each hashboard among the hashboard 1, the hashboard 2, . . . , and the hashboard N includes its own communication interface respectively. The communication interface of each hashboard is connected to the communication interface of the control board respectively. The control board is further connected to the power supply by the power supply and communication interface.

Implementations of this application further provide a hashboard series power supply solution. The power supply (corresponding to the power positive terminal) and the ground (corresponding to the power negative terminal) of each hashboard are connected end to end to form multiple levels of voltage domains in series.

Assuming that the voltage of each hashboard is V1, then the power supply voltage provided to N hashboards by the power supply is V1*N. In order to improve the computing power, it is only necessary to increase the number of the hashboards in series and to increase the output voltage of the power supply. Since the current in the series circuit is the same, the current drop loss of the power supply always remains unchanged. Moreover, when the output voltage of the power supply is raised, the power loss can be lower and the power supply efficiency can also be gradually improved due to the reduced voltage difference between the input and the output of the power supply.

After the hashboards are connected in series with each other, since there may be inconsistent among the computing chips of the hashboards, there may be uneven voltage division at the power-on moment. Therefore, it is preferable to arrange a voltage equalizing circuit in each hashboard to control the voltage of the hashboard to fall within a reasonable voltage range. The voltage equalizing circuit in the hashboard can be arranged between the power positive terminal and the power negative terminal inside the hashboard, and be adapted to equalize the voltage difference between the hashboards.

In some embodiments, the voltage equalizing circuit can be arranged in the power supply. Specifically, the power supply includes: (N−1) voltage equalizing circuits in one-to-one correspondence with (N−1) hashboards of the N hashboards other than the first hashboard; wherein each voltage equalizing circuit includes a positive terminal and a negative terminal, the positive terminal is connected to a power positive terminal of a corresponding hashboard, and the negative terminal is connected to a power negative terminal of the corresponding hashboard.

For example, the voltage equalizing circuit, arranged in the power supply or the hashboard, can be implemented as a combinatorial circuit including a buck circuit and a boost circuit. When the voltage of the hashboard is too high, the current is leaked through the boost circuit to reduce the voltage and to raise the voltage of another hashboard; and when the voltage of the hashboard is too low, the current is supplemented through the buck circuit to increase the voltage and to reduce the voltage of another hashboard.

In addition, considering that a communication signal of each hashboard is at a different potential (voltage domain), and the communication interface of each hashboard is connected to a same control board, therefore it is preferable to arrange an isolation circuit for isolating the communication signal in each hashboard.

In some embodiments, the isolation circuit can be arranged in the control board. Specifically, the control board includes: a controller; and N isolation circuits in one-to-one correspondence with N hashboards, wherein each isolation circuit includes a first end and a second end, the first end is adapted to be connected to a communication interface in a hashboard corresponding to the isolation circuit, and the second end is adapted to be connected to the controller. In some embodiments, the controller can be implemented as: a System on Chip (SOC) chip; a field programmable gate array (FPGA); a together combination of the SOC chip and the FPGA; a CPU; a microprocessor (MCU); a together combination of the CPU and the MCU; and the like.

For example, the isolation circuit, arranged in the control board or in the hashboard, can be implemented as a dedicated isolation chip; an optically coupled isolation circuit; a transformer isolation circuit; an isolation capacitor; an Ethernet interface including a transformer; and the like.

The above exemplarily describes typical examples of the controller and the isolation circuit. One skilled in the art can be aware that this description is only exemplary, and is not intended to limit the protection scope of the implementations of this application.

Based on the above description, implementations of this application further provide a hashboard of a digital processing device for obtaining digital currency. The hashboard is adapted to the above hashboard series power supply solution. The hashboard includes: a substrate; a power positive terminal and a power negative terminal, respectively mounted on the substrate and adapted to be connected to another hashboard in series; a communication interface mounted on the substrate; and a plurality of computing chips mounted on the substrate, wherein a signal transfer path of the plurality of computing chips has a chain configuration. That the power positive terminal and the power negative terminal are adapted to be connected in series to another hashboard means that at least one of the power positive terminal and the power negative terminal is connected to a power terminal of another hashboard, so as to form a series circuit. The signal transfer path refers to a transmission path of signal received and sent by the communication interface in the plurality of computing chips. That the signal transfer path of the plurality of computing chips has the chain configuration means that the signal received and sent by the communication interface are sequentially transferred one by one among the plurality of computing chips.

In some embodiments, the hashboard further includes: an isolation circuit mounted on the substrate, wherein the isolation circuit includes a first end and a second end, the first end is adapted to be connected to the communication interface, and the second end is adapted to be connected to the computing chip, which is the signal receiving starting point of the hashboard, in the chain configuration.

In some embodiments, the power supply includes a power factor correction (PFC) circuit; wherein a sum of voltages of N hashboards is equal to an output voltage of the PFC circuit.

It can be seen that after adopting the hashboard series solution of the implementations of this application, by increasing the number of the hashboards in series, the sum of the voltages of the hashboards reaches the PFC voltage, the DC-DC converter in the power supply may be omitted, so as to further improve the power supply efficiency and to reduce the costs significantly.

For example, assuming that the PFC voltage provided by the power supply is 400 volts (V), the 400V PFC voltage can be used to supply power to 33 serially connected 12V hashboards or 22 serially connected 18V hashboards, so as to omit the DC-DC converter of the power supply.

The above examples describe the number of hashboards in series and the voltage value of each hashboard. One skilled in the art can be aware that this description is only exemplary, and is not intended to limit the protection scope of the implementations of this application.

In some embodiments, the power supply includes N power supply submodules connected in series with each other, the N power supply submodules being in one-to-one correspondence with the N hashboards of the digital currency digital processing device, wherein each power supply submodule includes a positive electrode and a negative electrode, the positive electrode is connected to a power positive terminal of a corresponding hashboard, and the negative electrode is connected to a power negative terminal of the corresponding hashboard.

It can be seen that by arranging the N power supply submodules in one-to-one correspondence with the N hashboards in the power supply, it is convenient to realize voltage equalization of the hashboards.

Figure 3:
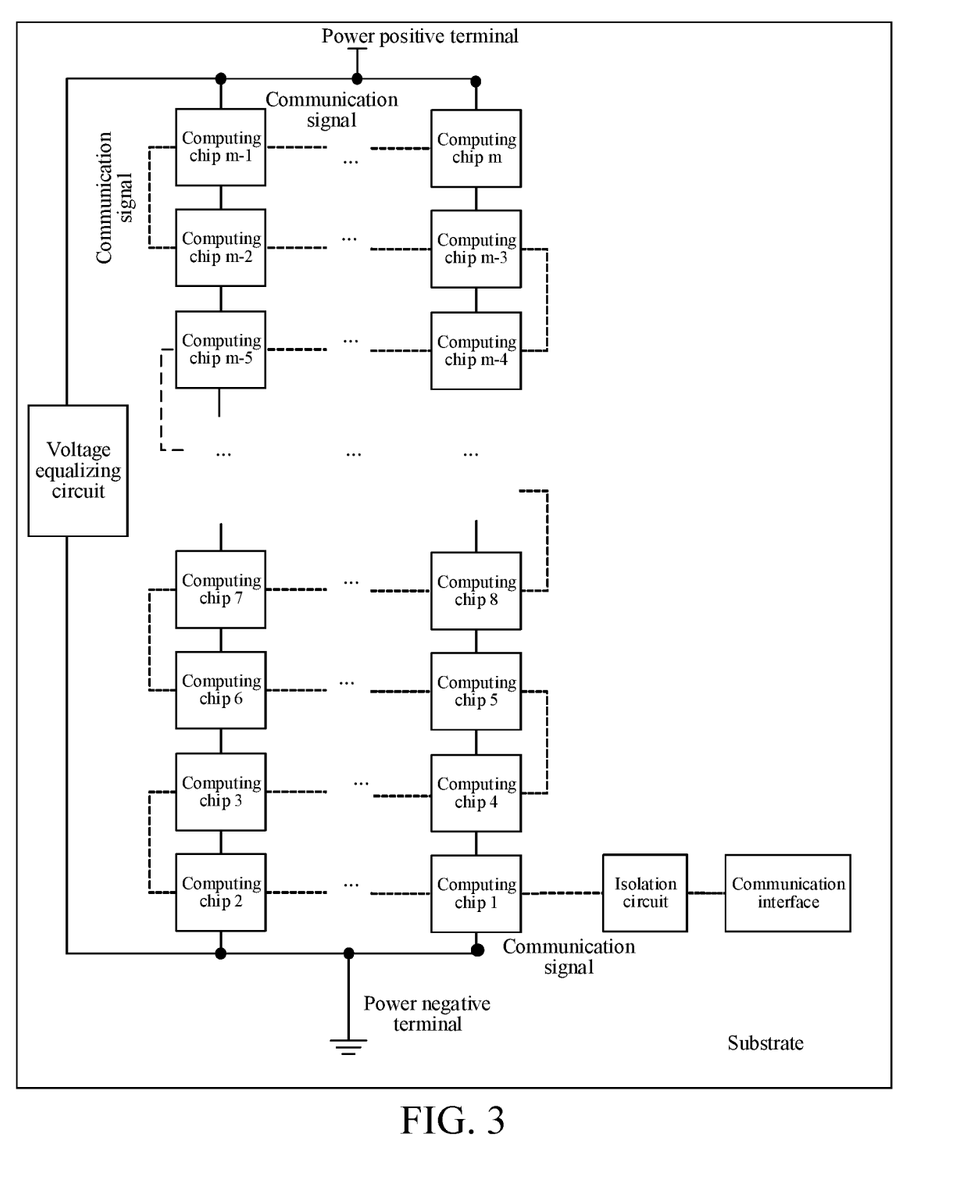
FIG. 3 is an exemplary structural diagram of a hashboard of a digital currency digital processing device of this application.

FIG. 3 is an exemplary structural diagram of a hashboard of a digital processing device for obtaining the digital currency of this application.

In FIG. 3, the hashboard includes a substrate, and the following mounted on the substrate:
(1). a power positive terminal;
(2). a power negative terminal;
(3). a communication interface;
(4). a computing chip 1, a computing chip 2, a computing chip 3, . . . , and a computing chip m, wherein m is a positive integer of at least 2;
(5). an isolation circuit; and
(6). a voltage equalizing circuit.

The power positive terminal and the power negative terminal are adapted to be connected in series to another hashboard. For example, (a). When the hashboard is the first hashboard in the series configuration, the power positive terminal is connected to the positive terminal of the power supply, and the power negative terminal is connected to the power positive terminal of a latter level of hashboard.

(b). When the hashboard is the last hashboard in the series configuration, the power positive terminal is connected to the power negative terminal of a former level of hashboard, and the power negative terminal is connected to the negative terminal of the power supply.

(c). When the hashboard is an intermediate hashboard (neither the first hashboard nor the last hashboard) in the series configuration, the power positive terminal is connected to the power negative terminal of a former level of hashboard, and the power negative terminal is connected to the power positive terminal of a latter level of hashboard.

Core voltage power supply of the computing chip 1, the computing chip 2, the computing chip 3, . . . , and the computing chip m adopts the series power supply mode, wherein the power positive and the power negative (ground) of each computing chip are connected end to end to form multiple levels of voltage domains in series, and each voltage domain has one or more computing chips.

In FIG. 3, the computing chip m and the computing chip m−1 form a voltage domain, wherein the computing chip m and the computing chip m−1 are in common connected to the power positive terminal; the computing chip m−2 and the computing chip m−3 form a voltage domain, wherein the computing chip m−2 is connected in series to the computing chip m−1, and the computing chip m−3 is connected in series to the computing chip m; the computing chip m−4 and the computing chip m−5 form a voltage domain, wherein the computing chip m−4 is connected in series to the computing chip m−3, and the computing chip m−5 is connected in series to the computing chip m−2; . . . ; the computing chip 7 and the computing chip 8 form a voltage domain; the computing chip 6 and the computing chip 5 form a voltage domain, wherein the computing chip 6 is connected in series to the computing chip 7, and the computing chip 5 is connected in series to the computing chip 8; the computing chip 3 and the computing chip 4 form a voltage domain, wherein the computing chip 3 is connected in series to the computing chip 6, and the computing chip 4 is connected in series to the computing chip 5; and the computing chip 2 and the computing chip 1 form a voltage domain, wherein the computing chip 2 is connected in series to the computing chip 3, the computing chip 1 is connected in series to the computing chip 4, and the computing chip 2 and the computing chip 1 are in common connected to the power negative terminal. It can be seen that the voltage domains are connected in series with each other (as shown by the solid line).

In addition, the communication interface can receive a communication signal from outside of the hashboard (for example, the control board), and can also send a communication signal to outside of the hashboard (for example, the control board). The signal transfer path of the computing chip 1, the computing chip 2, the computing chip 3, . . . , and the computing chip m has the chain configuration (as shown by the dashed line).

When the communication interface receives the communication signal from the control board, the signal transfer path is: the computing chip 1 (the signal receiving starting point in the computing chips)→ the computing chip 2→ the computing chip→ the computing chip 4→ the computing chip 5→ the computing chip 6→ the computing chip 7→ the computing chip 8→ . . . the computing chip m−5→ the computing chip m−4→ the computing chip m−3→ the computing chip m−2→ the computing chip m−1→ the computing chip m.

When the communication signal is sent to the control board by the communication interface, the signal transfer path is: the computing chip m→ the computing chip m−1→ the computing chip m−2→ the computing chip m−3→ the computing chip m−4→ the computing chip m−5 . . . the computing chip 8→ the computing chip 7→ the computing chip 6→ the computing chip 5→ the computing chip 4→ the computing chip 3→ the computing chip 2→ the computing chip 1 (the signal sending end point in the computing chips).

Considering that a communication signal of each hashboard is at a different potential (voltage domain), and each hashboard is connected to the same control board, thus it is preferable to arrange an isolation circuit in each hashboard. The isolation circuit includes a first end and a second end, the first end is connected to the communication interface, and the second end is connected to the computing chip (such as the computing chip 1 as shown in FIG. 3), which is the signal receiving starting point of the hashboard, in the chain configuration.

After a plurality of hashboards as shown in FIG. 3 are connected in series, since the hashboard chips may be inconsistent, there may be uneven voltage division at the power-on moment. Therefore, a voltage equalizing circuit is arranged in each hashboard to control the voltage of the hashboard to fall within a reasonable voltage range. In FIG. 3, the voltage equalizing circuit is arranged between the power positive terminal and the power negative terminal, and adapted to equalize a voltage difference between the hashboards. The voltage equalizing circuit includes a buck circuit and a boost circuit. When the voltage of the hashboard is too high, the current is leaked through the boost circuit to reduce the voltage; and when the voltage of the hashboard is too low, the current is supplemented through the buck circuit to increase the voltage. In some embodiments, the substrate can be implemented as an aluminum substrate.

Figure 4:
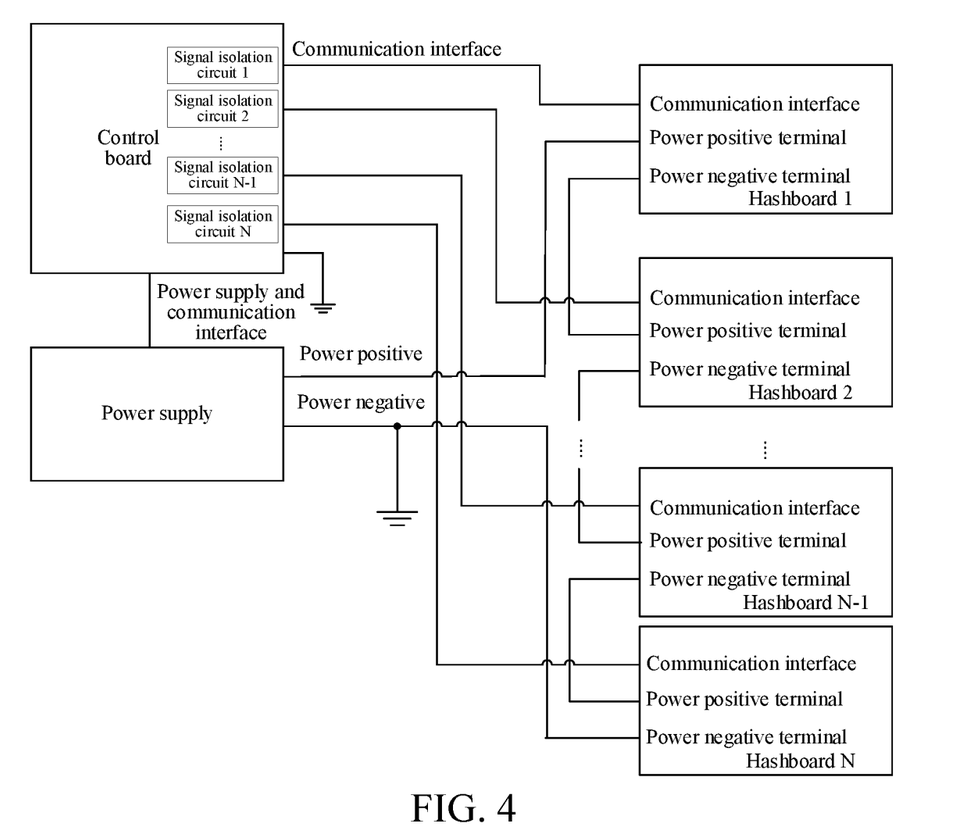
FIG. 4 is an exemplary structural diagram of a power supply system whose control board including a signal isolation circuit therein of this application.
Figure 5:
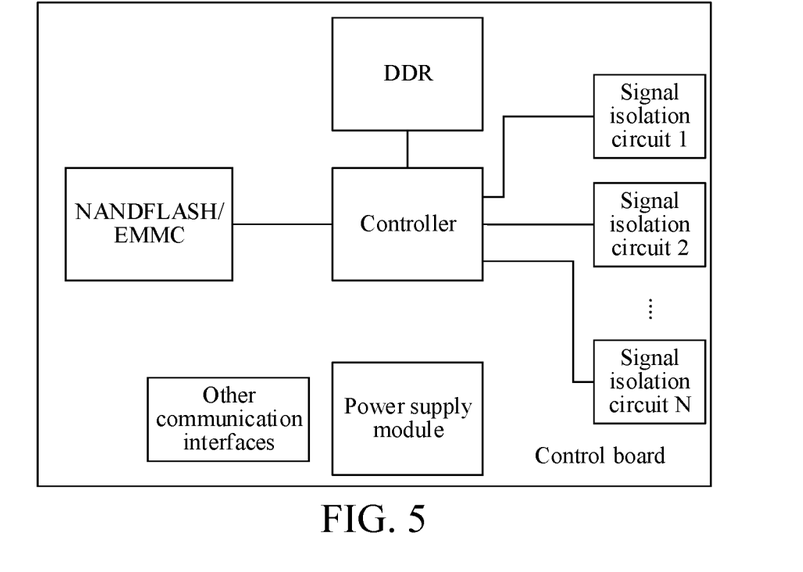
FIG. 5 is an exemplary structural diagram of a control board including a signal isolation circuit of this application.

FIG. 4 is an exemplary structural diagram of a power supply system whose control board including signal isolation circuits of this application. FIG. 5 is an exemplary structural diagram of a control board including signal isolation circuits of this application.

It can be seen from FIG. 4 and FIG. 5 that, the control board includes N isolation circuits in one-to-one correspondence with N hashboards, wherein each isolation circuit includes a first end and a second end, the first end is adapted to be connected to a communication interface in a hashboard corresponding to the isolation circuit, and the second end is adapted to be connected to a controller of the control board. The control board may further include: a power supply module, a double data rate synchronous dynamic random access memory (DDR), a NAND flash memory/embedded multimedia memory card (EMMC), another communication interface, and the like.

Figure 6:
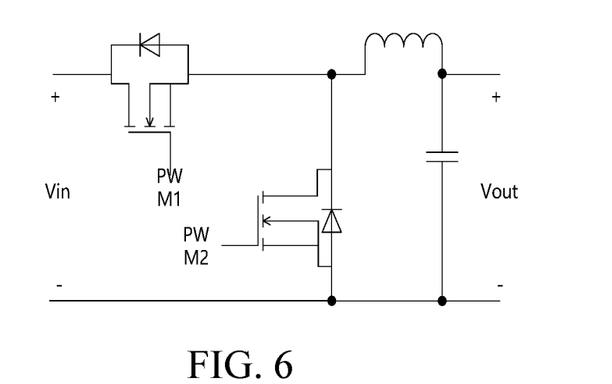
FIG. 6 is an exemplary structural diagram of a voltage equalizing circuit of this application.

FIG. 6 is an exemplary structural diagram of a voltage equalizing circuit of this application.

In FIG. 6, an output terminal Vout is connected to a power positive terminal and a power negative terminal of a hashboard respectively, and an input terminal Vin is connected to an own power supply of the voltage equalizing circuit.

The above exemplarily describes typical configurations of the voltage equalizing circuit. One skilled in the art can be aware that this description is only exemplary, and is not intended to limit the protection scope of the implementations of this application.

In some embodiments, an isolation circuit includes at least one of: a dedicated isolation chip; an optically coupled isolation circuit; a transformer isolation circuit; an isolation capacitor; an Ethernet interface including a transformer; and the like.

Figure 7:
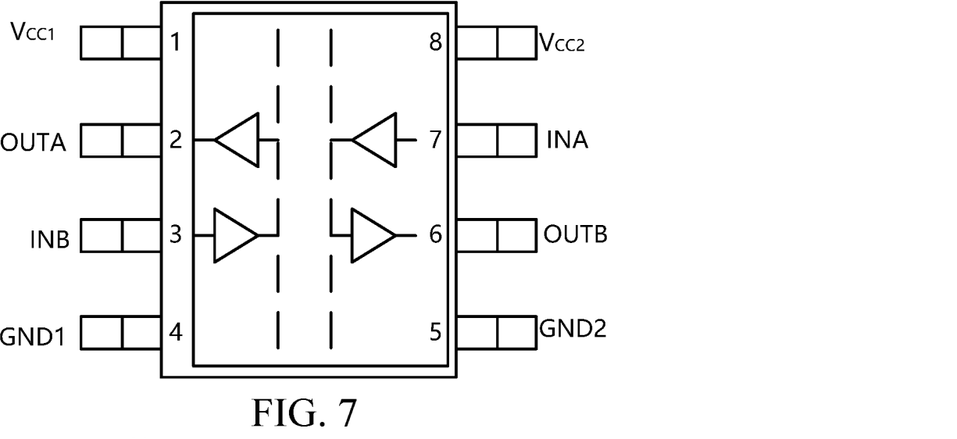
FIG. 7 is an exemplary structural diagram of a dedicated isolation chip circuit of this application.

FIG. 7 is an exemplary structural diagram of a dedicated isolation chip circuit of this application.

In FIG. 7, a dedicated isolation chip circuit is adopted to realize signal isolation, wherein an OUTA pin and an INB pin of the dedicated isolation chip are respectively connected to a signal input end and a signal output end of a computing chip 1, and an INA pin and an OUTB pin of the dedicated isolation chip are respectively connected to a signal output end and a signal input end of a communication interface.

Figure 8:
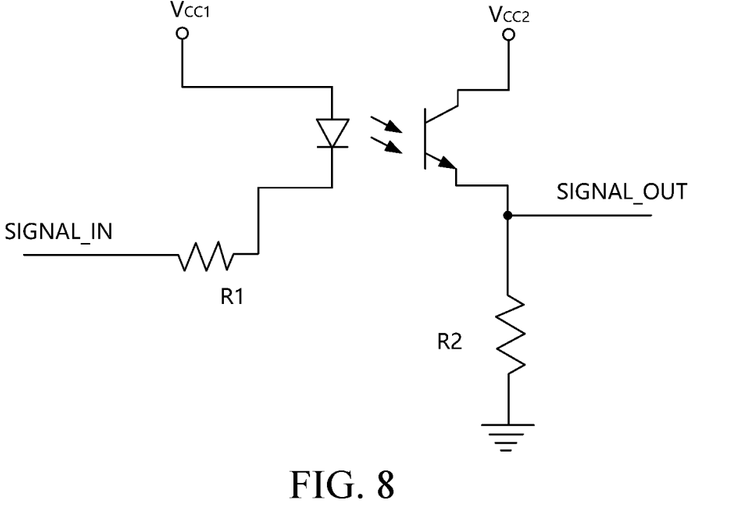
FIG. 8 is an exemplary structural diagram of a optically coupled isolation circuit of this application.

FIG. 8 is an exemplary structural diagram of an optically coupled isolation circuit of this application.

In FIG. 8, the optically coupled isolation circuit is adopted to realize signal isolation, wherein a SIGNAL_IN pin of the optically coupled isolation circuit is connected to a computing chip 1, and a SIGNAL_OUT pin of the optically coupled isolation circuit is connected to a communication interface.

Figure 9:
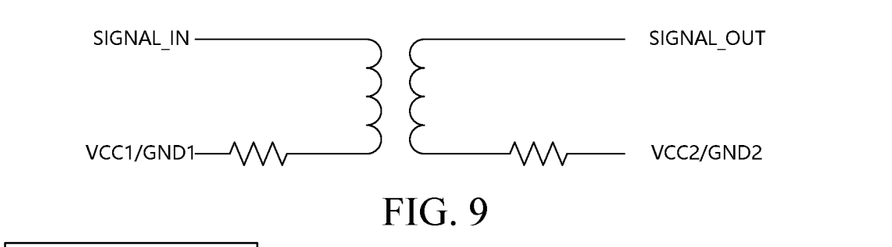
FIG. 9 is an exemplary structural diagram of a transformer isolation circuit of this application.

FIG. 9 is an exemplary structural diagram of a transformer isolation circuit of this application.

In FIG. 9, the transformer isolation circuit is adopted to realize signal isolation, wherein a SIGNAL_IN pin of the transformer isolation circuit is connected to a computing chip 1, and a SIGNAL_OUT pin of the transformer isolation circuit is connected to a communication interface.

The above exemplarily describes typical configurations of the isolation circuit. One skilled in the art can be aware that this description is only exemplary, and is not intended to limit the protection scope of the implementations of this application. In addition, the above exemplarily describes typical configurations of the hashboard. One skilled in the art can be aware that this description is only exemplary, and is not intended to limit the protection scope of the implementations of this application.

Implementations of this application further provide a power supply circuit of a digital processing device for obtaining digital currency, including: n hashboards as shown in FIG. 3, wherein n is a positive integer of at least 2; and n hashboards are connected in series to form a series power supply configuration, a power positive terminal of the first hashboard in the series power supply configuration is connected to a positive terminal of a power supply, and a power negative terminal of the last hashboard in the series power supply configuration is connected to a negative terminal of the power supply.

Implementations of this application further provide a digital processing device for obtaining digital currency, including: a housing; a control board located inside the housing; and N hashboards located inside the housing, N being a positive integer of at least 2, wherein each hashboard comprises: a substrate; a power positive terminal and a power negative terminal, respectively mounted on the substrate and adapted to be connected to another hashboard in series; a communication interface mounted on the substrate; and a plurality of computing chips mounted on the substrate, wherein a signal transfer path of the plurality of computing chips has a chain configuration. The N hashboards are connected in series to form a series power supply configuration. A power positive terminal of the first hashboard in the series power supply configuration is connected to a positive terminal of a power supply. A power negative terminal of the last hashboard in the series power supply configuration is connected to a negative terminal of the power supply.

In some embodiments, the control board includes: a controller; and N isolation circuits in one-to-one correspondence with the N hashboards, wherein each isolation circuit includes a first end and a second end, the first end is adapted to be connected to a communication interface in a hashboard corresponding to the isolation circuit, and the second end is adapted to be connected to the controller. In some embodiments, the controller can be implemented as: a SOC chip; an FPGA; a together combination of the SOC chip and the FPGA; a CPU; a microprocessor (MCU); a together combination of the CPU and the MCU; and the like.

In some embodiments, each hashboard further includes: an isolation circuit mounted on the substrate; the isolation circuit comprising a first end and a second end, the first end being adapted to be connected to the communication interface, and the second end being adapted to be connected to a computing chip, which is a signal receiving starting point of the hashboard, in the chain configuration.

In some embodiments, each hashboard further includes: a voltage equalizing circuit mounted on the substrate, the voltage equalizing circuit arranged between the power positive terminal and the power negative terminal, and adapted to equalize a voltage difference between the hashboard and another hashboard.

In some embodiments, the power supply includes: (N−1) voltage equalizing circuits in one-to-one correspondence with (N−1) hashboards of the N hashboards other than the first hashboard; wherein each voltage equalizing circuit comprises a positive terminal and a negative terminal, the positive terminal is connected to a power positive terminal of a corresponding hashboard, and the negative terminal is connected to a power negative terminal of the corresponding hashboard.

Figure 10:
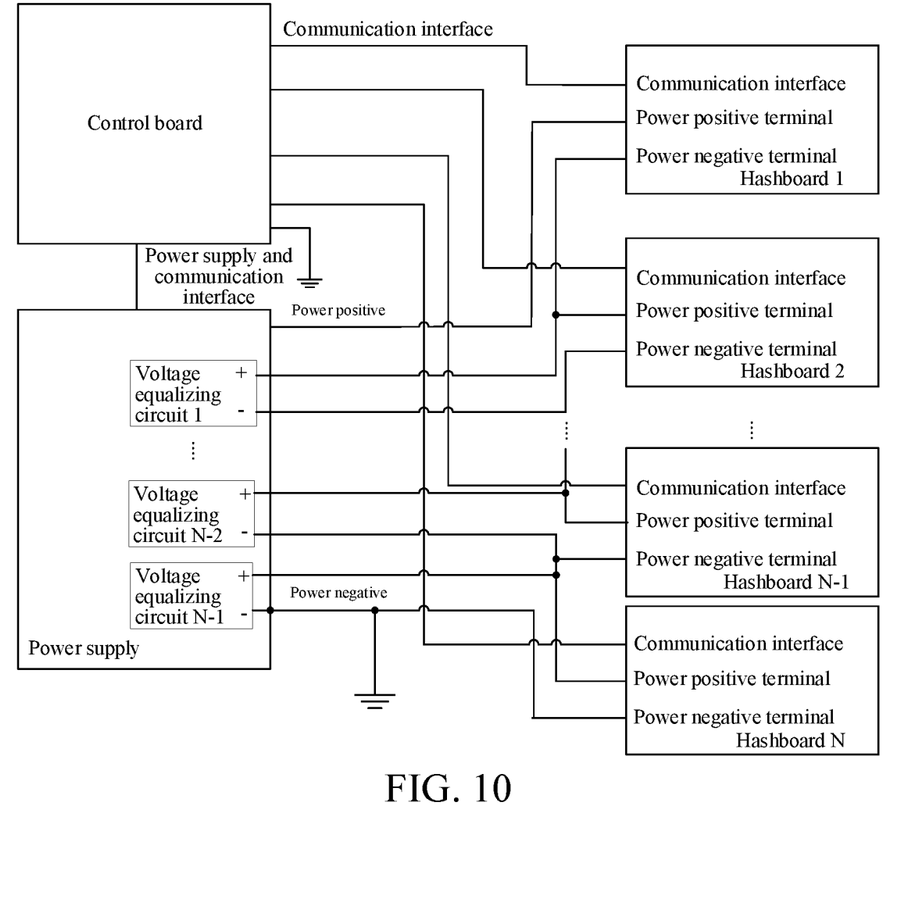
FIG. 10 is an exemplary structural diagram of a power supply system of a digital currency digital processing device with voltage equalizing circuits built in a power supply of this application.

FIG. 10 is an exemplary structural diagram of a power supply system of a digital processing device for obtaining digital currency, with voltage equalizing circuits built in a power supply of this application.

It can be seen from FIG. 10 that, the power supply includes: (N−1) voltage equalizing circuits; each voltage equalizing circuit being in one-to-one correspondence with (N−1) hashboards connected in series with each other of the N hashboards other than the first hashboard; wherein each voltage equalizing circuit includes a positive terminal and a negative terminal, the positive terminal is connected to a power positive terminal of a corresponding hashboard, and the negative terminal is connected to a power negative terminal of the corresponding hashboard.

Figure 11:
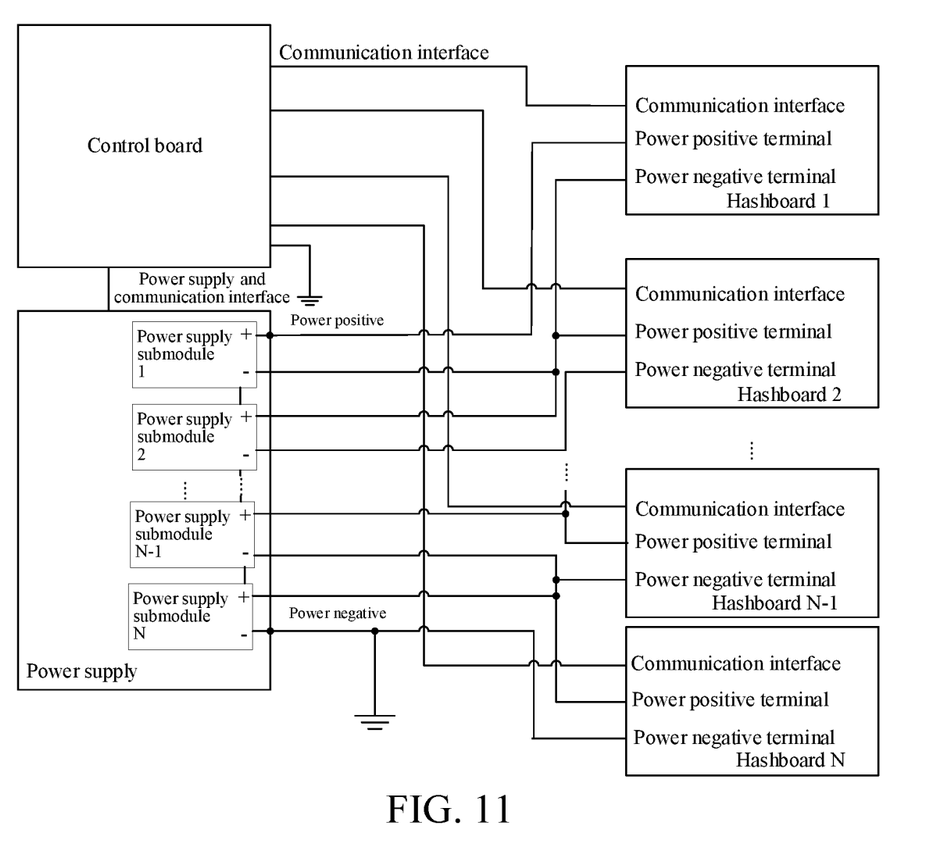
FIG. 11 is an exemplary structural diagram of a power supply system of a digital currency digital processing device with a plurality of power supply submodules built in a power supply of this application.

FIG. 11 is an exemplary structural diagram of a power supply system of a digital processing device for obtaining digital currency, with a plurality of power supply submodules built in a power supply of this application.

It can be seen from FIG. 11 that, the power supply includes N power supply submodules connected in series with each other; each power supply submodule being in one-to-one correspondence with each hashboard of the digital processing device, wherein each power supply submodule includes a positive electrode and a negative electrode, the positive electrode is connected to a power positive terminal of a corresponding hashboard, and the negative electrode is connected to a power negative terminal of the corresponding hashboard. Therefore, by arranging N power supply submodules in one-to-one correspondence with the N hashboards in the power supply, it is convenient to realize the voltage equalization among the N hashboards.

In an implementation, the power supply is mounted to an outer wall of the housing, so that a volume of the housing can be reduced, and it is convenient to maintain the power supply.

In summary, in implementations of this application, the hashboard includes: a substrate; a power positive terminal and a power negative terminal, respectively mounted on the substrate and adapted to be connected to another hashboard in series; a communication interface mounted on the substrate; and a plurality of computing chips mounted on the substrate, wherein a signal transfer path of the plurality of computing chips has a chain configuration. It can be seen that after adopting the implementations of this application, the mindset that the parallel configuration must be used to supply power to the hashboards is overcome, and the series configuration is used to supply power to the hashboards, which not only improves the power supply efficiency, but also reduces the complexity and the costs of the power supply design.

In addition, after adopting the implementations of this application, by increasing the number of hashboards in series, a sum of voltages of the hashboards can be made to reach an output voltage of the power factor correction circuit, so as to omit the DC-DC converter in the power supply, further to improve the power supply efficiency, and to reduce the costs significantly.

In addition, after adopting the implementations of this application: (1). the isolation circuits can be centrally arranged in the control board, or can be dispersedly arranged in each hashboard; (2). the voltage equalizing circuits can be centrally arranged in the power supply, or can be dispersedly arranged in each hashboard; and (3). the power supply may have a plurality of implementations.

It should be noted that not all steps and modules in the procedures and the structural diagrams are necessary, and some steps or modules may be omitted according to an actual need. An execution sequence of the steps is not fixed and may be adjusted according to needs. Division of the modules is merely functional division for ease of description. During actual implementation, one module may be divided into a plurality of modules to be implemented, and functions of a plurality of modules may be implemented by one module. The modules may be located in one device, or be located in different devices.

Hardware modules in the implementations may be implemented in mechanic manner or in electronic manner. For example, a hardware module may include specially designed permanent circuits or logic devices (for example, an application specific processor such as an FPGA or an ASIC) to complete specific operations. The hardware module may also include programmable logic devices or circuits temporarily configured by the software (for example, comprising a universal processor or another programmable processor) to perform specific operations. Regarding the hardware module is implemented by specifically using the mechanical manner, using the application-specific permanent circuits, or using the temporarily configured circuits (for example, configured by software), it can be decided according to consideration of costs and time.

Herein, "schematic" indicates "serving as an example, a case, or description", and any illustration or implementation described as "schematic" herein should not be interpreted as a more preferred or more advantageous technical solution. For brevity of the accompanying drawings, only parts related to this application are schematically shown in the accompanying drawings, and do not represent to be an actual structure of a product. In addition, for brevity of the accompanying drawings to be ease of understanding, for components with same structures or functions in some accompanying drawings, only one of the components is schematically shown or marked. Herein, "one" does not mean that the number of relevant parts of this application is limited to "only one", and "one" does not mean that the number of relevant parts of this application is excluded from "more than one". Herein, "up", "down", "front", "back", "left", "right", "inside", "outside" and the like are only used to indicate the relative positional relationship between the relevant parts, rather than limiting the absolute positions of these relevant parts.

The foregoing descriptions are merely preferred embodiments of this application, and are not intended to limit the protection scope of this application. Any modification, equivalent replacement or improvement to this application made without departing from the spirit and principle of this application shall fall within the protection scope of this application.

What is claimed is:

1. A digital processing device, comprising:
   a housing;
   a control board;
   N hashboards located inside the housing, N being a positive integer of at least 2, wherein each hashboard comprises: a substrate; a power positive terminal and a power negative terminal, respectively mounted on the substrate and adapted to be connected to another hashboard in series; a communication interface mounted on the substrate; and a plurality of computing chips mounted on the substrate, wherein a signal transfer path of the plurality of computing chips has a chain configuration; and
   a voltage equalizing circuit comprising a buck circuit and a boost circuit, wherein the voltage equalizing circuit is adapted to equalize voltage difference between the hashboards;
   wherein the N hashboards are connected in series to form a series power supply configuration, a power positive terminal of a first hashboard in the series power supply configuration is connected to a positive terminal of a power supply, and a power negative terminal of a last hashboard in the series power supply configuration is connected to a negative terminal of the power supply.

2. The digital processing device according to claim 1, wherein the control board comprises:
   a controller; and
   N isolation circuits in one-to-one correspondence with the N hashboards,
   wherein each isolation circuit comprises a first end and a second end, the first end is adapted to be connected to a communication interface in a hashboard corresponding to the isolation circuit, and the second end is adapted to be connected to the controller.

3. The digital processing device according to claim 1, wherein each hashboard further comprises: an isolation circuit mounted on the substrate; wherein the isolation circuit comprises a first end and a second end, the first end is adapted to be connected to the communication interface, and the second end is adapted to be connected to a computing chip, which is a signal receiving starting point of the hashboard, in the chain configuration.

4. The digital processing device according to claim 1, wherein each voltage equalizing circuit is mounted on the substrate of each hashboard wherein the voltage equalizing circuit is arranged between the power positive terminal and the power negative terminal.

5. The digital processing device according to claim 1, wherein (N−1) voltage equalizing circuits are in one-to-one correspondence with (N−1) hashboards of the N hashboards other than the first hashboard;
   wherein each voltage equalizing circuit comprises a positive terminal and a negative terminal, the positive terminal is connected to a power positive terminal of a corresponding hashboard, and the negative terminal is connected to a power negative terminal of the corresponding hashboard.

6. The digital processing device according to claim 1, wherein the power supply is mounted to an outer wall of the housing.

7. A hashboard of a digital processing device, comprising:
   a substrate;
   a power positive terminal and a power negative terminal, respectively mounted on the substrate and adapted to be connected to another hashboard in series;
   a communication interface mounted on the substrate;
   a plurality of computing chips mounted on the substrate, wherein a signal transfer path of the plurality of computing chips has a chain configuration; and
   a voltage equalizing circuit mounted on the substrate, wherein the voltage equalizing circuit comprises a buck circuit and a boost circuit, the voltage equalizing circuit is arranged between the power positive terminal and the power negative terminal, and adapted to equalize a voltage difference between the hashboard and another hashboard.

8. The hashboard according to claim 7, further comprising:
   an isolation circuit mounted on the substrate, wherein the isolation circuit comprises a first end and a second end, the first end is adapted to be connected to the communication interface, and the second end is adapted to be connected to a computing chip, which is a signal receiving starting point of the hashboard, in the chain configuration.

9. The hashboard according to claim 8, wherein the isolation circuit comprises at least one of:
   a dedicated isolation chip; an optically coupled isolation circuit; a transformer isolation circuit; an isolation capacitor; and an Ethernet interface comprising a transformer.

10. The hashboard according to claim 7, wherein the substrate is an aluminum substrate.

11. A power supply system of a digital processing device, comprising:
   the digital processing device according to claim 1; and
   a power supply for supplying power to the digital processing device.

12. The power supply system of the digital processing device according to claim 11, wherein the power supply comprises N power supply submodules connected in series with each other, the N power supply submodules being in one-to-one correspondence with the N hashboards of the digital processing device, wherein each power supply submodule comprises a positive electrode and a negative electrode, the positive electrode is connected to a power positive terminal of a corresponding hashboard, and the negative electrode is connected to a power negative terminal of the corresponding hashboard.

13. The power supply system of the digital processing device according to claim 11, wherein the power supply comprises a power factor correction circuit;
   wherein a sum of voltages of the N hashboards of the digital processing device is equal to an output voltage of the power factor correction circuit.

14. The power supply system of the digital processing device according to claim 11, wherein the power supply comprises: (N−1) voltage equalizing circuits in one-to-one correspondence with (N−1) hashboards of the N hashboards other than the first hashboard;
   wherein each voltage equalizing circuit comprises a positive terminal and a negative terminal, the positive terminal is connected to a power positive terminal of a corresponding hashboard, and the negative terminal is connected to a power negative terminal of the corresponding hashboard.

* * * * *